US012668297B2

(12) United States Patent
Shamie et al.

(10) Patent No.: US 12,668,297 B2
(45) Date of Patent: Jun. 30, 2026

(54) COMBINED ELECTRIC MOTOR BEAM AXLE ASSEMBLY AND STEERING ACTUATOR ASSEMBLY

(71) Applicant: Schaeffler Technologies AG & Co. KG, Herzogenaurach (DE)

(72) Inventors: Christopher Shamie, Wooster, OH (US); Allen McAfoos, Wooster, OH (US); Shaun Tate, Grand Blanc, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 406 days.

(21) Appl. No.: 18/235,397

(22) Filed: Aug. 18, 2023

(65) Prior Publication Data

US 2024/0075979 A1 Mar. 7, 2024

Related U.S. Application Data

(60) Provisional application No. 63/403,467, filed on Sep. 2, 2022.

(51) Int. Cl.
B62D 6/06 (2006.01)
B62D 5/04 (2006.01)

(52) U.S. Cl.
CPC ............. B62D 5/0418 (2013.01); B62D 6/06 (2013.01)

(58) Field of Classification Search
CPC ................................ B62D 5/0418; B62D 6/06
See application file for complete search history.

(56) References Cited

U.S. PATENT DOCUMENTS

| | | | |
|---|---|---|---|
| 2012/0103708 A1* | 5/2012 | Hennings ............. | B60K 7/0007 180/65.6 |
| 2013/0056947 A1* | 3/2013 | Moon ................... | B60G 21/051 280/124.128 |
| 2017/0050514 A1* | 2/2017 | Li ......................... | B60K 17/043 |
| 2019/0375305 A1 | 12/2019 | Matt | |
| 2019/0375453 A1 | 12/2019 | Buchwitz et al. | |
| 2020/0406960 A1* | 12/2020 | Anetzberger ......... | B60B 35/163 |
| 2021/0047016 A1* | 2/2021 | Rygg ..................... | B63B 59/06 |
| 2021/0155283 A1* | 5/2021 | Sakagami ............. | B62D 5/0418 |
| 2021/0237795 A1 | 8/2021 | Wenk | |
| 2022/0135123 A1 | 5/2022 | Black et al. | |

* cited by examiner

Primary Examiner — Tan Q Nguyen
(74) Attorney, Agent, or Firm — Volpe Koenig

(57) ABSTRACT

An electric vehicle module assembly including a steering actuator sub-assembly connected to a beam axle sub-assembly. The steering actuator sub-assembly provides multiple functions, including the inherent function of the steering actuator to improve the turning radius of the electric vehicle, as well as positioning the center of gravity of the electric vehicle module assembly in a more desirable position such that NVH issues are reduced for the electric vehicle.

14 Claims, 8 Drawing Sheets

COMBINED ELECTRIC MOTOR BEAM AXLE ASSEMBLY AND STEERING ACTUATOR ASSEMBLY

CROSS REFERENCE TO RELATED APPLICATION(S)

This application claims the benefit of U.S. Provisional Application 63/403,467, filed Sep. 2, 2022 and titled "Combined Electric Motor Beam Axle Assembly and Steering Actuator Assembly", which is incorporated by reference as if fully set forth.

TECHNICAL FIELD

The present disclosure relates to a combined assembly including a steering actuator sub-assembly and a beam axle sub-assembly for an electric vehicle.

BACKGROUND

Steering actuators and beam axle assemblies are well known components that can be used for both internal combustion engine (ICE) vehicles and electric vehicles. As the demand for greater power and range for electric vehicles increases, it has become desirable to install larger batteries in electric vehicles which generally requires that the wheel base of the vehicles is enlarged. By moving the wheel base further apart, the turning radius or circle for said vehicles suffers. The center of gravity is also undesirably positioned for beam axle assemblies in electric vehicles, which increases NVH issues.

It would be desirable to provide a configuration that both addresses the center of gravity issues and turning radius issues in electric vehicles.

SUMMARY

An electric vehicle module assembly is disclosed herein. The electric vehicle module assembly includes a beam axle sub-assembly and a steering actuator sub-assembly directly connected to the beam axle sub-assembly.

In one example, the beam axle sub-assembly and the steering actuator sub-assembly are connected via a common housing. The common housing can define a wall that defines an internal boundary between the beam axle sub-assembly and the steering actuator sub-assembly.

The steering actuator sub-assembly can be connected to the beam axle sub-assembly via at least one fastening element, in another example.

The steering actuator sub-assembly can be connected to a first side of the beam axle sub-assembly, and the beam axle sub-assembly can comprise an electric motor that is arranged on a second side opposite from the first side.

A center of gravity for the electric vehicle module assembly can be defined closer to a wheel axis (X) of the beam axle sub-assembly than an electric motor of the beam axle sub-assembly.

In another example, an electric vehicle module assembly is disclosed that includes a beam axle sub-assembly including an electric motor and a wheel axle assembly defining a wheel axis (X), and a steering actuator sub-assembly that is directly connected to the beam axle sub-assembly. The steering actuator sub-assembly can be arranged on a first side of the wheel axle assembly and the electric motor can be arranged on a second side of the wheel axle assembly opposite from the first side.

A center of gravity for the electric vehicle module assembly can be located on the wheel axle assembly, in one example. The center of gravity for the electric vehicle module assembly can be defined closer to the wheel axle assembly than the electric motor, in one example.

A method of reducing noise, vibration and harshness (NVH) in electric vehicles is also disclosed herein. The method can include connecting a steering actuator sub-assembly directly to a beam axle sub-assembly to form an electric vehicle module assembly, such that a center of gravity of the electric vehicle module assembly shifts away from an electric motor of the beam axle sub-assembly and towards a wheel axle assembly of the beam axle sub-assembly.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION

Certain terminology is used in the following description for convenience only and is not limiting. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
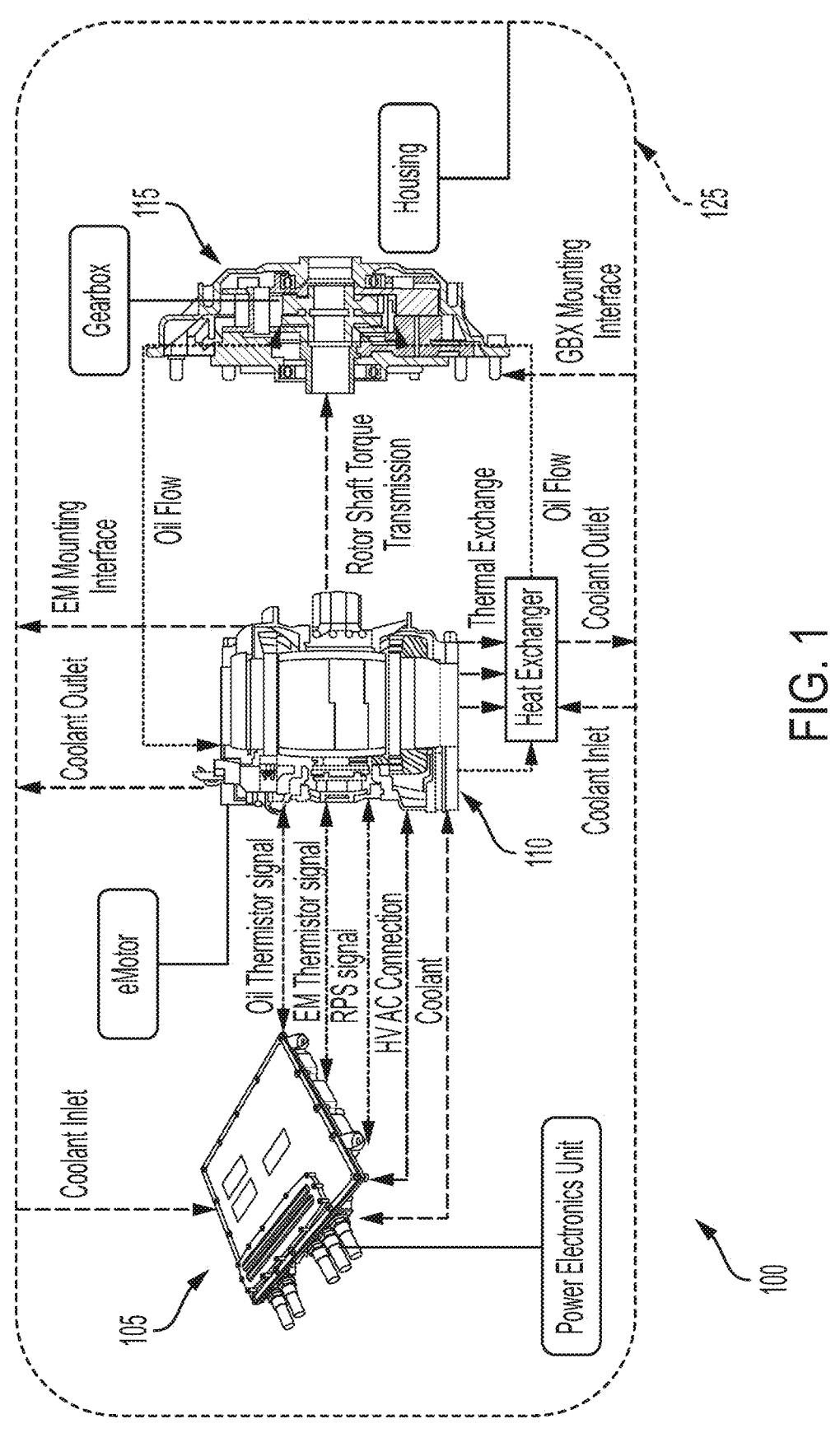
FIG. 1 is a schematic showing a drive assembly according to a first example.
Figure 2:
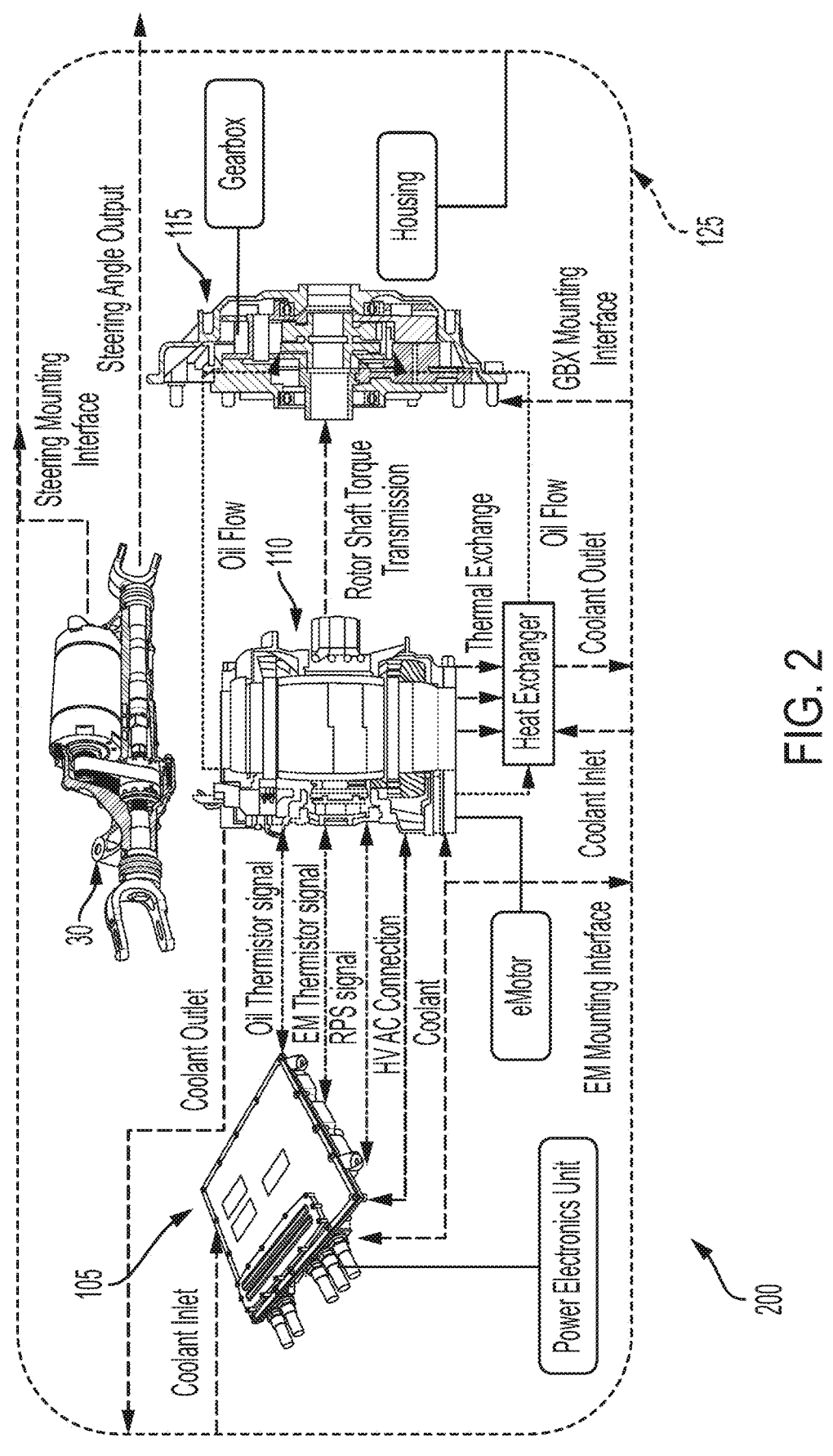
FIG. 2 is a schematic showing a drive assembly according to a second example.

FIG. 1 illustrates a schematic of a vehicle drive assembly 100 that generally includes a power electronics unit 105, an electric motor (e-motor) 110, a gear box 115, and a housing 125. Various pathways for electric signals, and fluid flow paths are also illustrated in FIG. 1. FIG. 2 illustrates a similar vehicle drive assembly 200 as the vehicle drive assembly 100 of FIG. 2, but further includes a steering actuator 30.

Figure 3A:
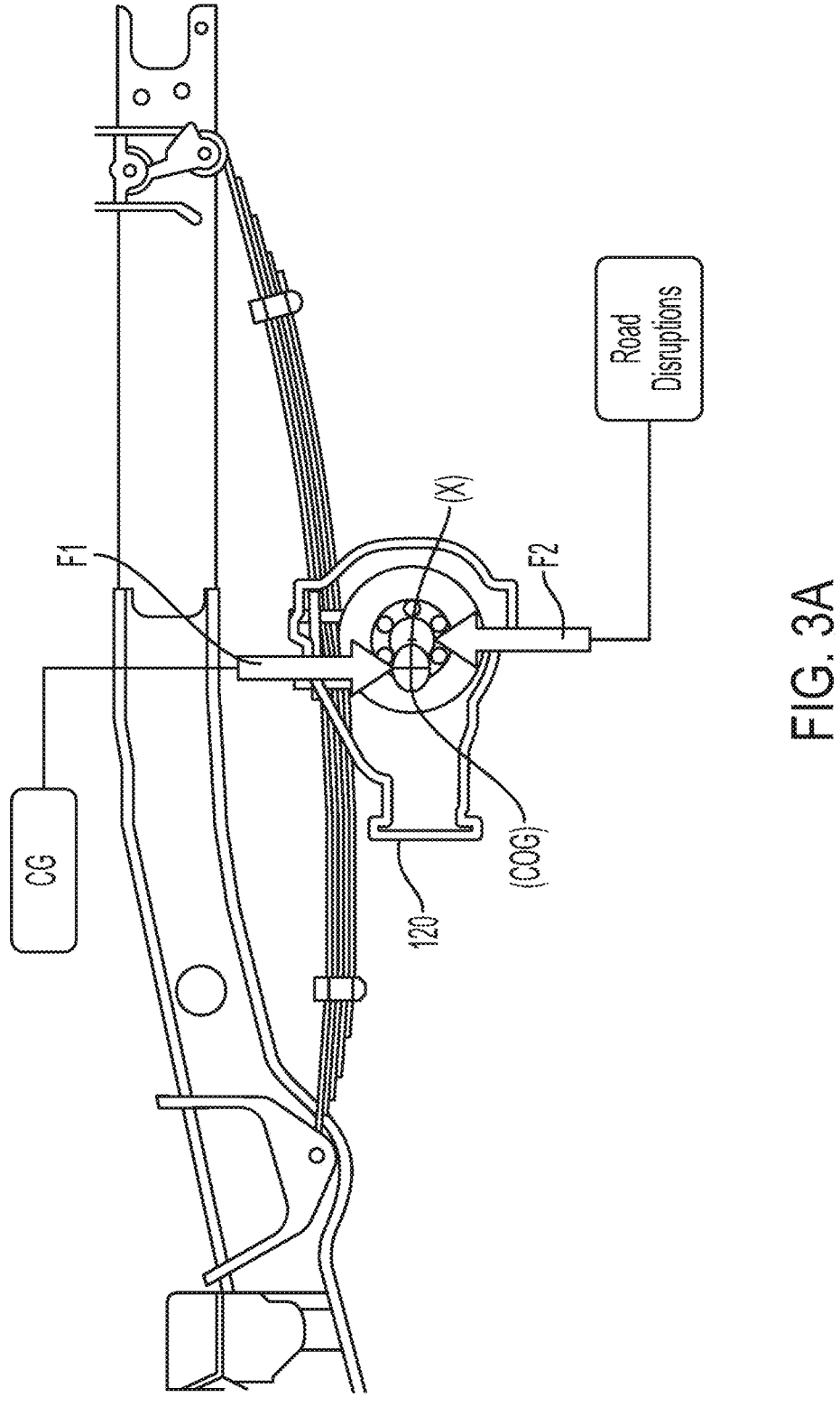
FIG. 3A is a side view of a beam axle assembly indicating associated forces or loads according to one example.

FIG. 3A illustrates a beam axle assembly 120, for example in a traditional internal combustion engine (ICE) configuration. As shown in FIG. 3A, a center of gravity (COG) is generally defined in a medial portion or middle portion of the beam axle assembly 120. As the vehicle is driven, bumps or other road disruptions will generate forces or loads (F2) at the wheel axis (X) that are generally in an opposite direction from the force (F1) due to the mass of the beam axle assembly 120. It is desirable to position the center of gravity as close as possible to the wheel axis (X) to limit the amount of NVH, but this is more difficult to achieve in electric motor configurations as compared to ICE due to the battery weight, among other considerations.

Figure 3C:
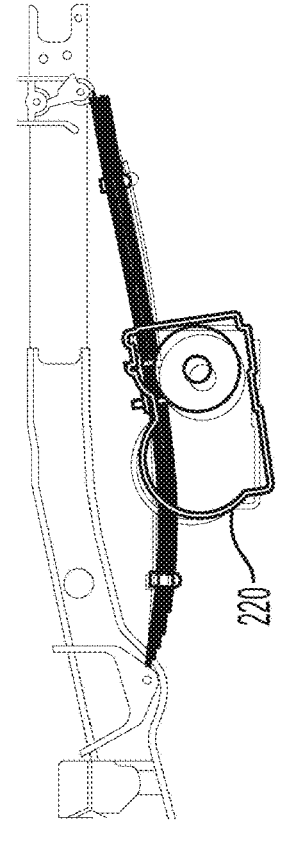
FIG. 3C is a side view of the beam axle assembly of FIG. 3B during an increased force condition according to one example.
Figure 3B:
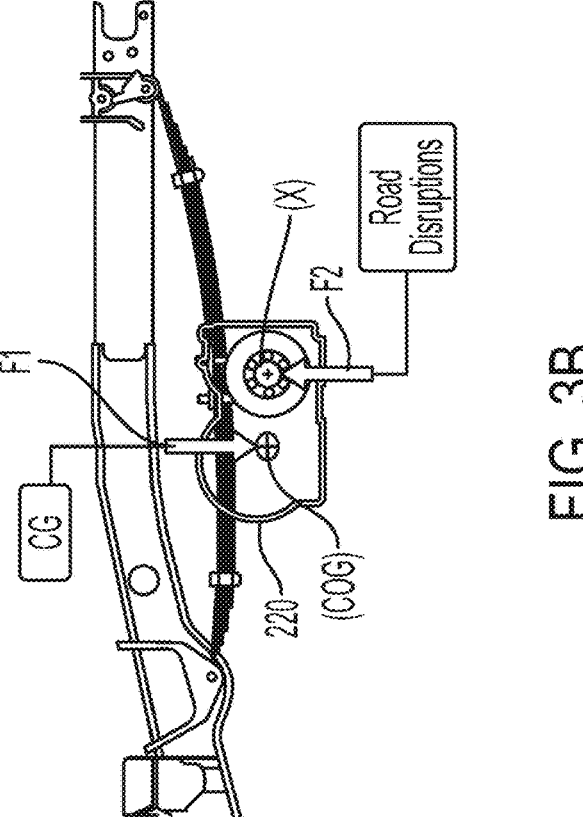
FIG. 3B is a side view of another type of a beam axle assembly indicating associated forces or loads according to one example.

FIGS. 3B and 3C show one configuration for an electric vehicle including a beam axle sub-assembly 220. As shown in FIG. 3B, the center of gravity is defined in a position that is more distant from the wheel axis (X) as compared to FIG. 3A. As a result, the forces or loads from the road disruptions generate a more disruptive effect on the vehicle, as shown in FIG. 3C.

Figure 4:
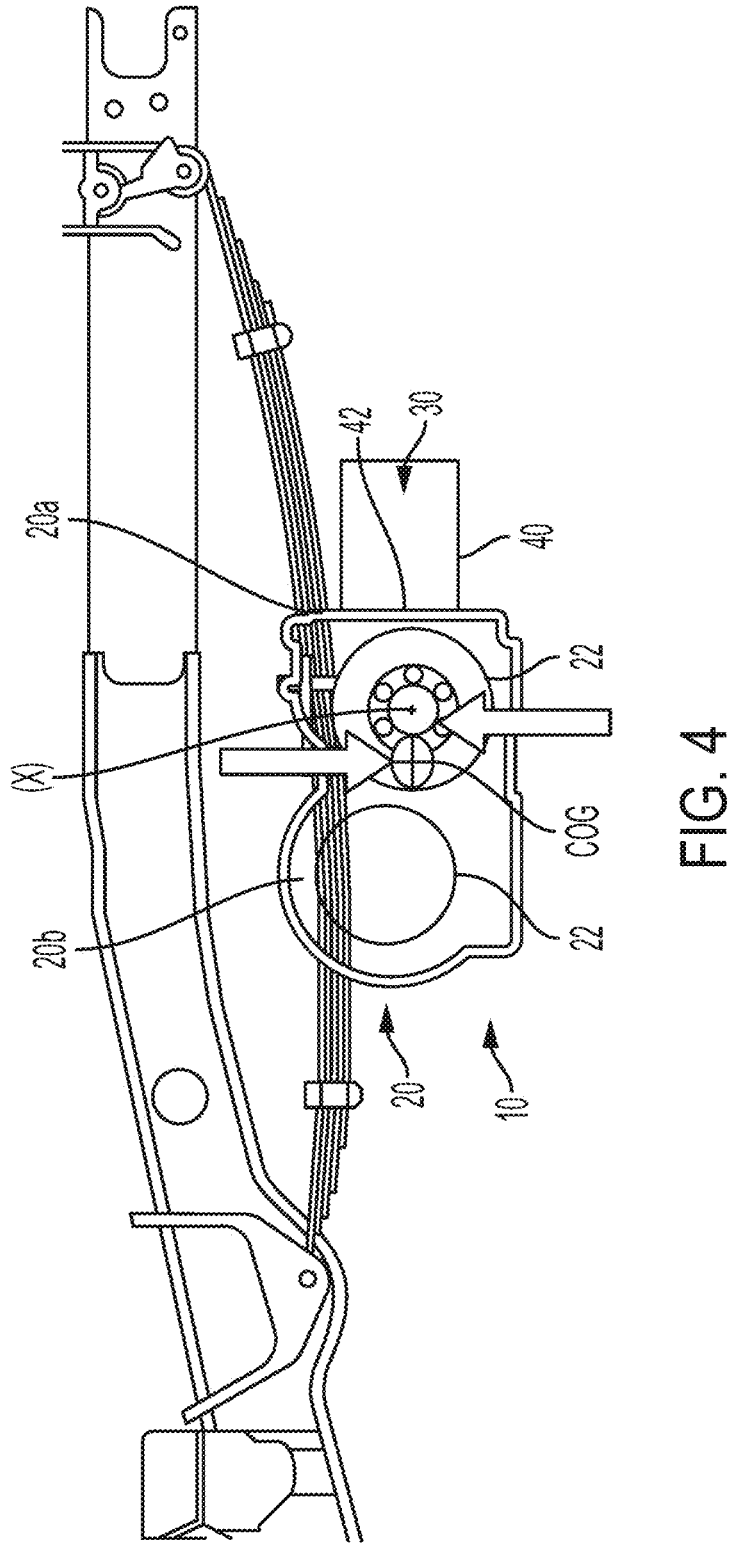
FIG. 4 is a side view of an electric vehicle module assembly according to one example.
Figure 5:
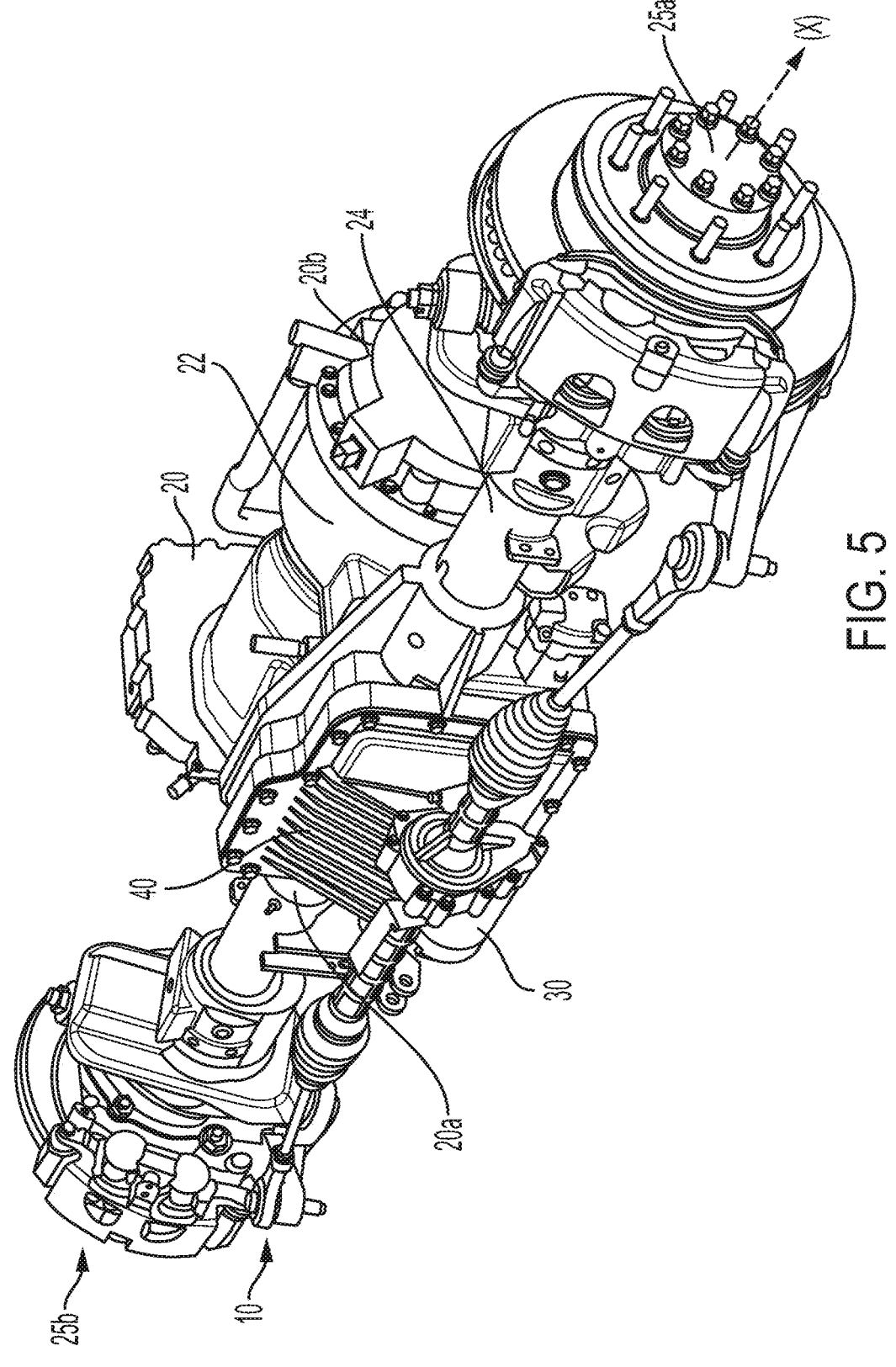
FIG. 5 is a perspective view of an electric vehicle module assembly according to one example.

FIG. 4 illustrates one example of an electric vehicle module assembly 10 according to the present disclosure, in which the center of gravity is located in a more desirable position. As shown in FIG. 4, the electric vehicle module assembly 10 includes a beam axle sub-assembly 20, and a steering actuator sub-assembly 30. As shown in FIGS. 4 and 5, the beam axle sub-assembly 20 can generally include an electric motor 22 and a wheel axle assembly 24, among other components. The wheel axle assembly 24 can include wheel end assemblies 25a, 25b including brakes and other components.

Figure 6:
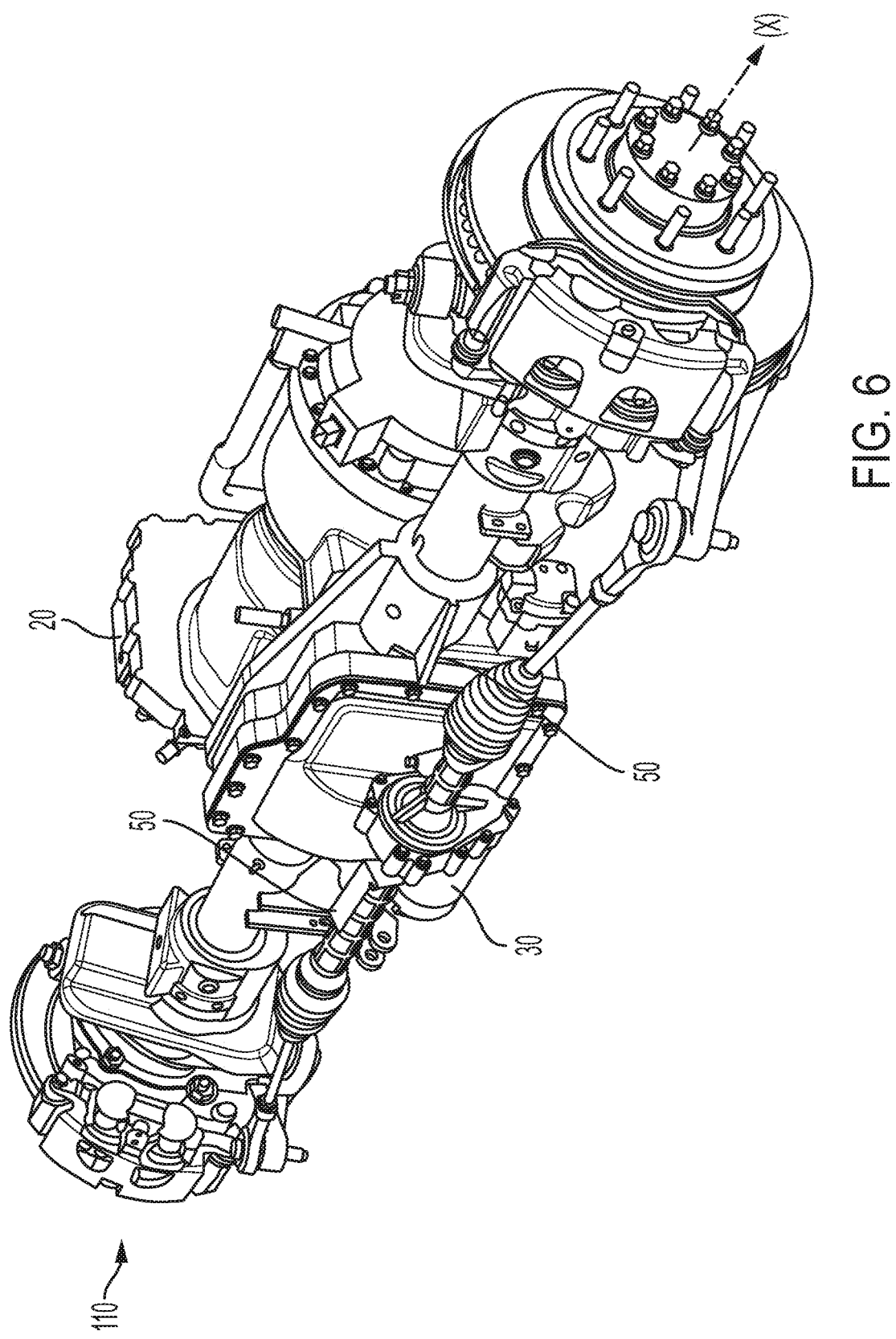
FIG. 6 is a perspective view of an electric vehicle module assembly according to another example.

According to one aspect of the present disclosure, the steering actuator sub-assembly 30 can be connected to the beam axle sub-assembly 20. More specifically, the steering actuator sub-assembly 30 can be directly attached to the beam axle sub-assembly 20, such as via a common housing 40 as shown in FIG. 5, or can be attached via fastening elements 50 (i.e. bolts, fasteners, rivets, etc.) as shown in FIG. 6. By attaching the steering actuator sub-assembly 30 to the beam axle sub-assembly 20, the center of gravity for the electric vehicle module assembly 10 is defined closer to the wheel axis (X) as compared to an electric vehicle module assembly 10 that lacks an integrated steering actuator.

According to one aspect of the present disclosure, positioning the steering actuator sub-assembly 30 achieves multiple advantages. According to one advantage, the steering actuator sub-assembly 30 addresses issues related to the increased size of the wheel base for electric vehicles due to an increased battery size. According to another advantage, the steering actuator sub-assembly 30 also addresses the center of gravity issue encountered by other electric vehicles in which the center of gravity is positioned undesirably far from the wheel axis (X). The present configuration provides a multi-functional solution by installing a component (i.e. the steering actuator sub-assembly 30) directly onto or with the beam axle sub-assembly 20 to both address turn radius issues and NVH issues associated with electric vehicles.

A method of reducing noise, vibration and harshness (NVH) in electric vehicles is also disclosed herein. The method can include connecting a steering actuator sub-assembly 30 directly to a beam axle sub-assembly 20 to form an electric vehicle module assembly 10, such that a center of gravity of the electric vehicle module assembly 10 is shifted away from an electric motor 22 of the beam axle sub-assembly 20 and towards a wheel axle assembly 24 of the beam axle sub-assembly 20. Various other steps can be included for the method.

Figure 8:
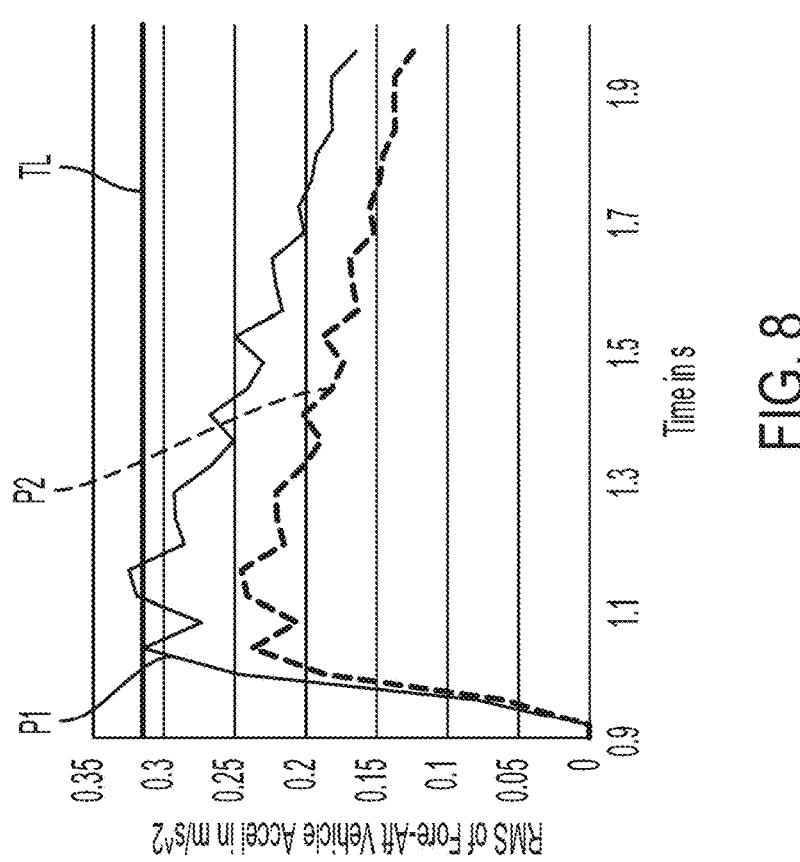
FIG. 8 is a graph showing the RMS of fore-aft acceleration for two configurations.
Figure 7:
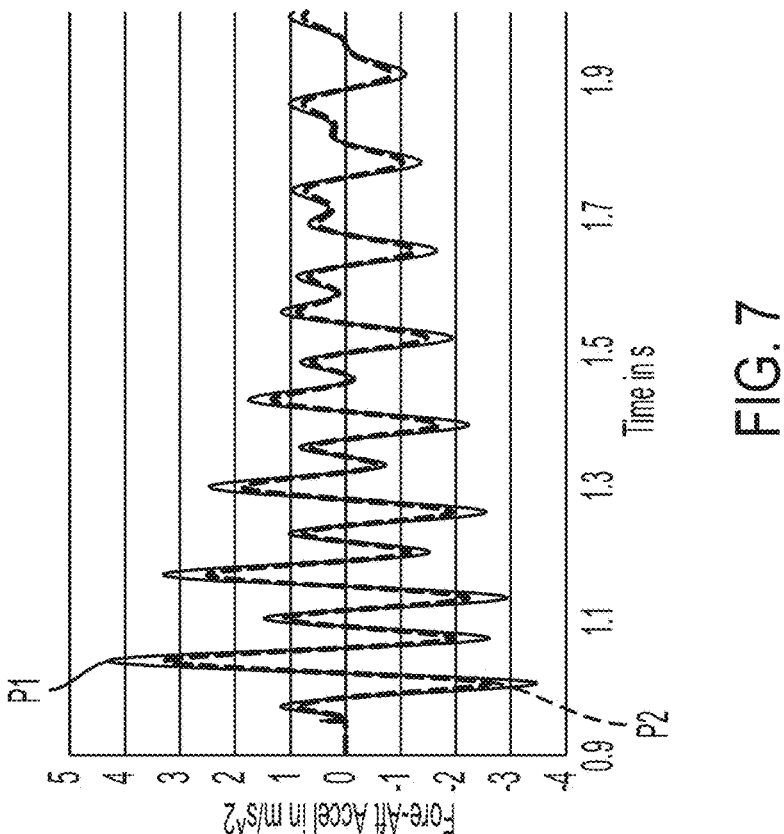
FIG. 7 is a graph showing fore-aft acceleration for two configurations.

FIG. 7 is a graph showing fore-aft acceleration in m/s² for (i) a standard electric vehicle (line P1) and (ii) an electric vehicle including the electric vehicle module assembly according to the present disclosure (line P2). FIG. 8 is another graph showing the RMS of fore-aft acceleration in m/s² for (i) a standard electric vehicle (line P1) and (ii) an electric vehicle including the electric vehicle module assembly according to the present disclosure (line P2), along with a threshold line (TL) indicating a limit for human perceptibility.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS

10 electric vehicle module assembly
20, 120, 220 beam axle sub-assembly
20a first side of the beam axle sub-assembly
20b second side of the beam axle sub-assembly
22 electric motor
24 wheel axle assembly
25a, 25b wheel end assemblies
30 steering actuator sub-assembly
40 common housing
42 wall
50 fastening element
100, 200 vehicle drive assembly
105 power electronics unit
110 electric motor
115 gear box
125 housing

What is claimed is:

1. An electric vehicle module assembly comprising:
a beam axle sub-assembly; and
a steering actuator sub-assembly directly connected to the beam axle sub-assembly;
wherein the steering actuator sub-assembly is connected to a first side of the beam axle sub-assembly, and the beam axle sub-assembly comprises an electric motor that is arranged on a second side opposite from the first side.

2. The electric vehicle module assembly according to claim 1, wherein the beam axle sub-assembly and the steering actuator sub-assembly are connected via a common housing.

3. The electric vehicle module assembly according to claim 2, wherein the common housing includes a wall that defines an internal boundary between the beam axle sub-assembly and the steering actuator sub-assembly.

4. The electric vehicle module assembly according to claim 1, wherein the steering actuator sub-assembly is connected to the beam axle sub-assembly via at least one fastening element.

5. The electric vehicle module assembly according to claim 1, wherein a center of gravity for the electric vehicle module assembly is defined closer to a wheel axis of the beam axle sub-assembly than an electric motor of the beam axle sub-assembly.

6. A electric vehicle module assembly comprising:

a beam axle sub-assembly including an electric motor and a wheel axle assembly defining a wheel axis; and a steering actuator sub-assembly directly connected to the beam axle sub-assembly;

wherein the steering actuator sub-assembly is arranged on a first side of the wheel axle assembly and the electric motor is arranged on a second side of the wheel axle assembly opposite from the first side.

7. The electric vehicle module assembly according to claim 6, wherein a center of gravity for the electric vehicle module assembly is located on the wheel axle assembly.

8. The electric vehicle module assembly according to claim 6, wherein a center of gravity for the electric vehicle module assembly is defined closer to the wheel axle assembly than the electric motor.

9. The electric vehicle module assembly according to claim 6, wherein a common housing encloses at least a portion of the beam axle sub-assembly and at least a portion of the steering actuator sub-assembly.

10. The electric vehicle module assembly according to claim 6, wherein the steering actuator sub-assembly is directly connected to the beam axle sub-assembly via at least one fastening element.

11. A method of reducing noise, vibration and harshness (NVH) in electric vehicles, the method comprising:

connecting a steering actuator sub-assembly directly to a beam axle sub-assembly to form an electric vehicle module assembly, such that a center of gravity of the electric vehicle module assembly is shifted away from an electric motor of the beam axle sub-assembly and towards a wheel axle assembly of the beam axle sub-assembly.

12. The method according to claim 11, further comprising providing a common housing and using the common housing to enclose at least a portion of the beam axle sub-assembly and at least a portion of the steering actuator sub-assembly.

13. The method according to claim 11, wherein the steering actuator sub-assembly is fastened to the beam axle sub-assembly via at least one fastening element.

14. The method according to claim 11, wherein the center of gravity for the electric vehicle module assembly is located on the wheel axle assembly.

* * * * *